(12) United States Patent
Choisnet et al.

(10) Patent No.: US 9,863,499 B2
(45) Date of Patent: Jan. 9, 2018

(54) ANCHOR CHAIN

(71) Applicant: IDEOL, La Ciotat (FR)

(72) Inventors: Thomas Choisnet, Marseilles (FR); Stéphan Marobin, La Ciotat (FR)

(73) Assignee: IDEOL, La Ciotat (FR)

( * ) Notice: Subject to any disclaimer, the term of this patent is extended or adjusted under 35 U.S.C. 154(b) by 0 days.

(21) Appl. No.: 15/031,434

(22) PCT Filed: Oct. 21, 2014

(86) PCT No.: PCT/FR2014/052668
§ 371 (c)(1),
(2) Date: Apr. 22, 2016

(87) PCT Pub. No.: WO2015/059396
PCT Pub. Date: Apr. 30, 2015

(65) Prior Publication Data
US 2016/0258510 A1    Sep. 8, 2016

(30) Foreign Application Priority Data

Oct. 25, 2013  (FR) ..................... 13 60453

(51) Int. Cl.
*F16G 15/04* (2006.01)
*F16G 15/12* (2006.01)
(Continued)

(52) U.S. Cl.
CPC .............. *F16G 15/12* (2013.01); *B63B 21/20* (2013.01); *F16G 13/12* (2013.01); *F16G 13/14* (2013.01);
(Continued)

(58) Field of Classification Search
CPC .......... F16G 15/00; F16G 15/04; F16G 13/14; F16G 13/16; F16G 13/12; F16G 15/12; B21B 21/20
(Continued)

(56) References Cited

U.S. PATENT DOCUMENTS 2,966,878 A * 1/1961 Feiser, Jr. ............... F16G 13/14
                                                    116/212
3,985,093 A * 10/1976 Eidem .................... B63B 21/22
                                                    114/230.23
(Continued)

FOREIGN PATENT DOCUMENTS

CN          1092705 A      9/1994
CN        201461858 U      5/2010
(Continued)

OTHER PUBLICATIONS

International Search Report for PCT/FR2014/052668 dated Feb. 20, 2015 (4 pages).

*Primary Examiner* — David B Jones
(74) *Attorney, Agent, or Firm* — Bookoff McAndrews, PLLC

(57) ABSTRACT

The invention relates to the field of anchor chains, and more particularly an anchor chain (1) comprising a first plurality of links (3) and, at the end of the chain, a second plurality of links (4) comprising at least three successive links (4) in each of which at least one property selected from its bar diameter and the elastic limit of its material is substantially greater than in each of the links (3) of the first plurality, in order to improve the ability of the chain to withstand fatigue by bending of the links (4) in the second plurality.

12 Claims, 3 Drawing Sheets

(51) Int. Cl.
  *F16G 13/14*    (2006.01)
  *F16G 15/00*    (2006.01)
  *F16G 13/16*    (2006.01)
  *B63B 21/20*    (2006.01)
  *F16G 13/12*    (2006.01)

(52) U.S. Cl.
  CPC ............. *F16G 13/16* (2013.01); *F16G 15/00* (2013.01); *F16G 15/04* (2013.01)

(58) Field of Classification Search
  USPC ............................................................ 59/78
  See application file for complete search history.

(56) References Cited

U.S. PATENT DOCUMENTS

| | | | | |
|---|---|---|---|---|
| 4,068,467 A | * | 1/1978 | Schreyer | F16G 15/00 294/82.11 |
| 2013/0298521 A1 | * | 11/2013 | Sun | F16G 15/04 59/85 |

FOREIGN PATENT DOCUMENTS

| | | |
|---|---|---|
| CN | 102434630 A | 5/2012 |
| GB | 1 372 354 | 10/1974 |
| KR | 2013-0044994 A | 5/2013 |

* cited by examiner

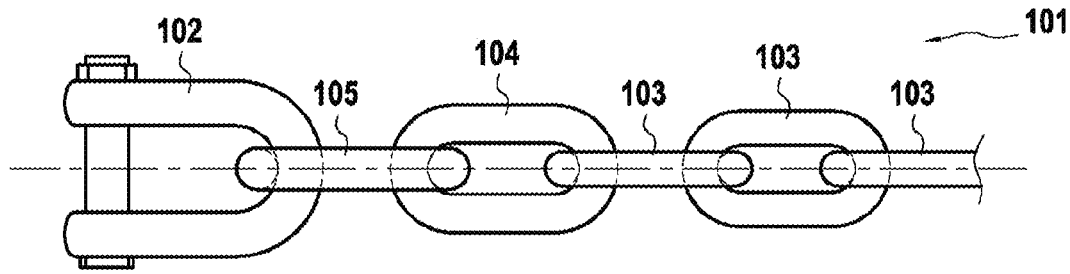
FIG.1
(prior art)
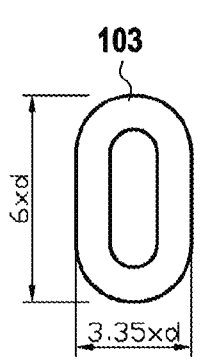 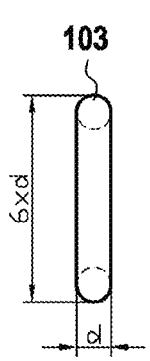   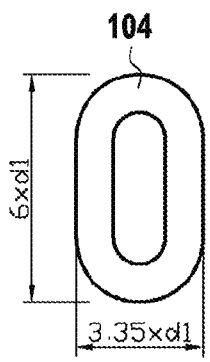 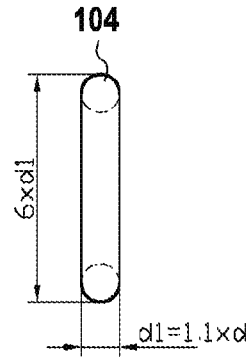
FIG.2A  FIG.2B    FIG.3A  FIG.3B
(prior art)              (prior art)
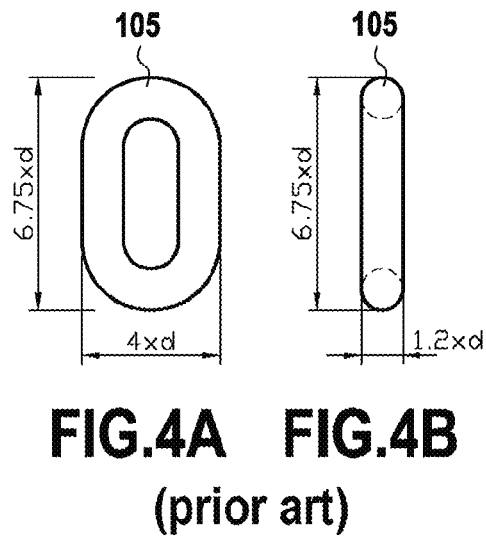
FIG.4A  FIG.4B
(prior art)

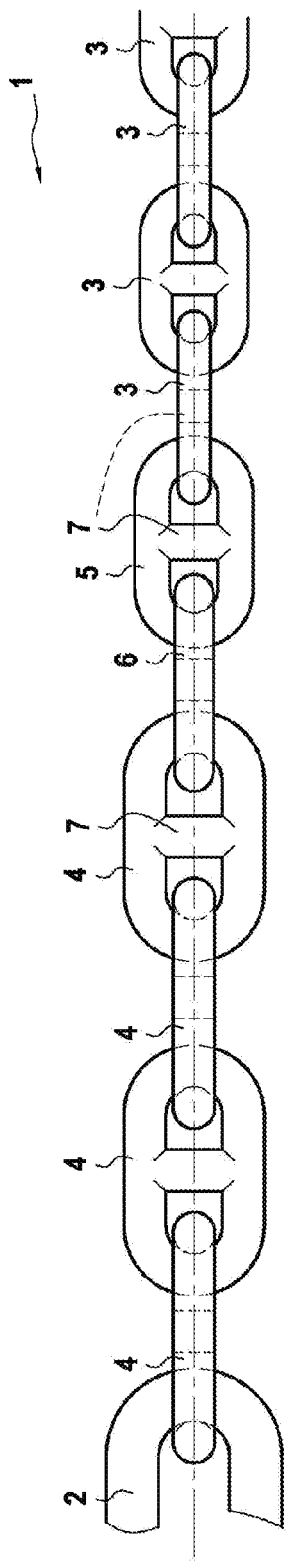
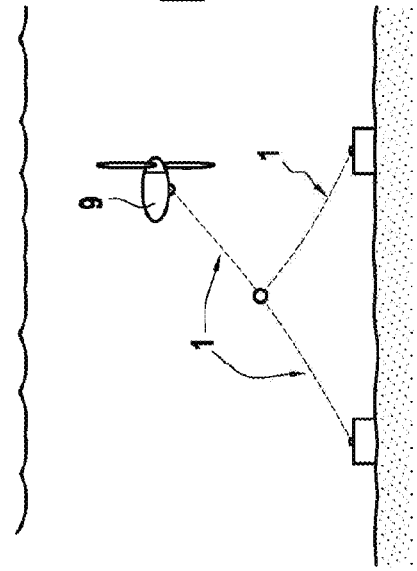
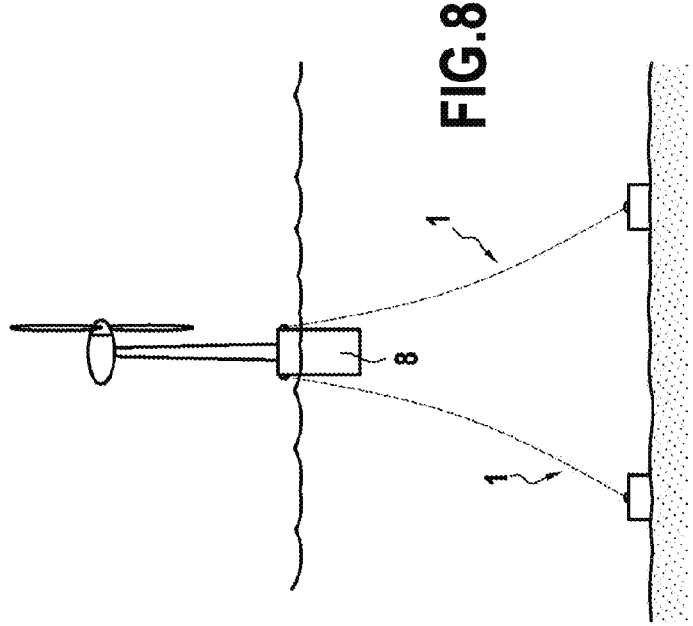

ANCHOR CHAIN

This application is a U.S. national stage filing under 35 U.S.C. §371 of International Application No. PCT/FR2014/052668, filed on Oct. 21, 2014, incorporated by reference herein in its entirety, which claims the benefit of priority to French Patent Application No. 1360453, filed on Oct. 25, 2013.

BACKGROUND OF THE INVENTION

The present invention relates to the field of anchor chains, and more particularly to anchor chains for applications at sea.

In the present context, the term "anchor chain" is used to mean a succession of links connected to one another for transmitting mechanical tension, and serving in particular to connect a floating body to an anchor point in order to restrict the movement of said floating body. The links of such an anchor chain may in particular be made of metal. They may be stud links, in order to avoid them being flattened, or they may be links without studs.

Although anchor chains are designed to transmit mechanical forces mainly in tension, in practice, chains anchoring a floating body and subjected to high levels of tension can also be subjected, at their ends, to large bending stresses, in particular in the proximity of their connection with the floating body. The cause of this bending is the combination of pivoting movements of the floating body and of geometrical imperfections in the areas of contact between adjacent links.

Specifically, the imperfections in combination with high levels of tension prevent hinging between adjacent links. Movements of the floating body thus lead to lateral forces on the anchor chain and to bending moments that are transmitted between adjacent links. In the long term, such recurrent bending can in particular give rise to breaking by fatigue, as described in particular in the article "Failure of chains by bending in deepwater mooring systems", presented by P. Jean, K. Goosens, and D. L'Hostis at the 2005 Offshore Technology Conference in Houston, Tex., USA.

In the prior art, in order to avoid such fatigue, and thus lengthen the lifetime of anchor chains, attempts have been made to limit the bending movements to which the links of the chain are subjected by improving the hinges at the ends of chains or by locally modifying the links.

Thus, by way of example, in international patent applications WO 2010/112603 and WO 98/40306, proposals are made to interpose universal joint connectors and long lever arms between the end of the anchor chain and the floating body. Nevertheless, such connectors present the drawback of being heavy and voluminous, which can make them difficult to integrate. Also, the cost of universal joints, in particular if they are to withstand a hostile environment such as seawater, is very high.

Proposals have also be made in particular in international patent application WO 2008/0951106 to interpose, not hinged joints, but rather segments of cable between the end of the anchor chain and the floating body. Nevertheless, that normally presents the drawback of requiring the length of the cable segment to be determined accurately before anchoring the floating body, and thus also of requiring the position of the anchor point to be determined accurately.

Devices and methods have also be proposed to replace segments of chain in operation before they reach a fatigue threshold. By way of example, that can be achieved by passing such segments through a deflector sheave or a specific fairlead and by changing the links bearing against the connection by means of a winch, e.g. as shown in French patent application FR 2 601 322. Nevertheless, that normally requires heavy and expensive devices to be installed on the floating body, and also storage for replacement segments of chain. Furthermore, the links of those replacement segments of chain can also be damaged by passing through such devices.

OBJECT AND SUMMARY OF THE INVENTION

The present invention seeks to remedy those drawbacks. More specifically, the present description seeks to propose an anchor chain that makes it possible to avoid bending fatigue in links at the end of the chain.

In at least one embodiment, this object is achieved by the fact that the anchor chain comprises a first plurality of links, and a second plurality of links at the end of the chain and comprising at least three successive links in each of which at least one properly selected from its bar diameter and the elastic limit of its material is substantially greater than in each of the links of the first plurality. The "bar diameter" of a link means here the minimum diameter of a cross-section of a bar forming the link.

As explained above, the geometrical imperfections of the area of contact between adjacent links play an important role in transmitting bending moments between links at the head end of a chain. It has been discovered that strength tests performed on chains before they are installed constitute a significant source of such geometrical imperfections. Such tests are normally performed to be sure of the quality of the welds of the bars forming the links, and also that the chain will not suffer significant plastic lengthening during its intended lifetime. Typically, during such tests, chains are tested up to 70% of their breaking load, which can nevertheless cause the elastic limit of the material of the links to be exceeded at certain points, thereby permanently deforming the areas of contact between links and creating flats at the interfaces between adjacent links. Such flats can subsequently contribute to transmitting bending moments between the links, thereby generating additional and varying stresses in the links, in particular at the head end of the chain, whenever the floating body performs pivoting movements.

Because of the increase in the bar diameter and/or the elastic limit in the material of at least three successive links at the end of the cable, it is possible to limit the formation of flats, and thus the transmission of bending moments, between these at least three links that are the most exposed to lateral forces.

In particular, the bar diameter of each of the links of the second plurality may be substantially greater than the bar diameter of each of the links of the first plurality, and in particular at least 1.2 times the diameter of each of the links of the first plurality. The term "substantially greater" is used herein to mean that the difference is greater than manufacturing tolerances, which may be as much as 5% of said diameter, for example.

Furthermore, by spreading out forces during the strength tests, this increase in diameter limits local plastic deformation of links during strength tests, thereby reducing the formation of flats. Furthermore, for a given bending moment, the bending stress is inversely proportional to the cube of this diameter. Consequently, even if the lever arm, and thus the bending moment, increases in a manner that is directly proportional to said diameter of the link, for a given lateral force, the stress will reduce with the square of the diameter. As a result of these two effects in combination, increasing the diameter of the links in the second plurality thus makes it possible to reduce the bending stresses at the head end of the chain very significantly whenever the anchor chain is subjected to lateral forces by pivoting movements of the floating body.

Nevertheless, as an alternative to or in addition to this larger diameter, the elastic limit of the material of each of the links in the second plurality may be substantially greater than the elastic limit of each of the links in the first plurality, and at least 1.2 times the elastic limit of the material of each of the links of the first plurality. The term "substantially greater" is used herein to mean that the difference is greater than manufacturing tolerances, which may be as much as 5% of said elastic limit, for example.

This increase in the elastic limit reduces the area of each link of said second plurality that is subjected to plastic deformation during strength testing, and thus also serves to reduce the formation of flats that facilitate the transmission of bending moments between adjacent links.

In order to obtain a gradual transition between the links of the first plurality and the links of the second plurality, the anchor chain may further include at least one intermediate link between said first plurality of links and said at least three successive links of the second plurality, said at least one intermediate link differing from each of the links of the first plurality and of the second plurality. In particular, said at least one intermediate link may present a bar diameter substantially greater than the bar diameter of any of said first plurality of links, but less than the bar diameter of each of the links of the second plurality. More specifically, the anchor chain may include at least one first intermediate link adjacent to said first plurality of links, and at least one second intermediate link adjacent to said at least three successive links of the second plurality and presenting a bar diameter that is substantially greater than the bar diameter of the first intermediate link.

In order to avoid bending fatigue at both ends of the anchor chain, said second plurality of links may comprise at least three successive links at a first end of the anchor chain and at least three other successive links at a second end of the anchor chain, opposite from said first end.

The present invention also relates to a floating body having at least one such anchor chain. In this context, the term "floating body" should be understood broadly, covering not only bodies that emerge at least in part above the liquid surface, but also bodies that generate a positive buoyancy force, but that are held fully submerged by their anchoring.

In particular, the floating body may be in the form of a floating platform. Since such platforms are typically for use with static anchoring of long duration, it is particularly appropriate to solve the problem of bending fatigue in the at least one anchor chain of such a platform. Nevertheless, the floating body could also be a ship, for example.

Furthermore, the floating body may in particular support at least one device for generating electricity, such as for example a wind turbine, although other types of devices for generating electricity can also be envisaged, such as for example marine turbines; and indeed other applications can be envisaged, in particular in the field of producing oil and gas.

BRIEF DESCRIPTION OF THE DRAWINGS

The invention can be well understood and its advantages appear better on reading the following detailed description of two embodiments shown as nonlimiting examples. The description refers to the accompanying drawings, in which:

FIG. 1 shows a prior art anchor chain segment;

FIGS. 2A to 2B show two different views of a first link of the FIG. 1 chain;

FIGS. 3A to 3B show two different views of a second link of the FIG. 1 chain;

FIGS. 4A to 4B show two different views of a third link of the FIG. 1 chain;

FIG. 7 shows an anchor chain segment in a second embodiment;

FIG. 8 shows diagrammatically a floating platform supporting a wind turbine and connected to a plurality of anchor points by anchor chains; and FIG. 9 shows diagrammatically a marine turbine with positive buoyancy that is held submerged below the water surface by anchor chains connecting it to a plurality of anchor points.

DETAILED DESCRIPTION OF THE INVENTION

Figure 5:
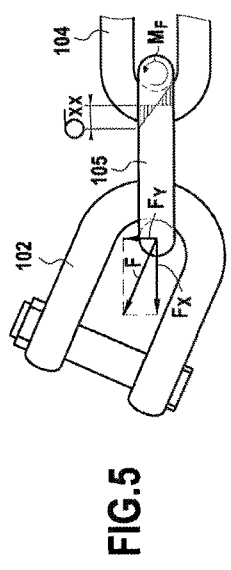
FIG. 5 shows how a bending moment is generated at the end of the FIG. 1 chain.

FIG. 1 shows a prior art anchor chain 101 in compliance with the API Spec 2F standard of the American Petroleum Institute. This anchor chain 101, which is connected at one end to an anchor shackle 102, comprises a plurality of successive common links 103, and between these common links 103 and the shackle 102, a standard enlarged link 104, and an end link 105.

As shown in FIGS. 2A and 2B, each common link 103 presents a bar diameter d, a width equal to 3.35 times d, and a length equal to six times d. The standard enlarged link 104, which in the chain 101 is adjacent to said plurality of successive common links 103, and which is shown in detail in FIGS. 3A and 3B, presents a bar diameter d1 equal to 1.1 times the bar diameter d of the common links 103, a width equal to 3.35 times d1, and a length equal to six times d1. Finally, the end link 105, which is interposed between the standard enlarged link 104 and the anchor shackle 102, resents a bar diameter equal to 1.2 times d, a width equal to 4 times d, and a length equal to 6.75 times d, as shown in FIGS. 4A and 4B.

Although the standard enlarged link 104 and the end link 105 are of diameter greater than the diameter of the common links 103, some of the common links are close enough to the end of the chain 101 to be affected by bending moments in response to lateral movements of the floating body secured to the anchor shackle 102.

FIG. 5 shows the generation of such a bending moment $M_F$ when the force F transmitted by the link 102 to the end link 105 is not in alignment with the main direction X of the chain 101, and when surface imperfections of the links 105, 104 and the tension between them prevent them from turning freely relative to one another. The force F is thus resolved into a tension force $F_x$ in alignment with the main direction X of the chain 101, and a lateral force $F_y$ perpendicular thereto and generating, in the end link 105, a bending moment $M_F$ increasing towards the enlarged standard link 104. In the end link 104, this bending moment $M_F$ leads to additional stress $\rho_{xx}$ perpendicular to the cross-section of the end link 104. As explained in the summary of the invention, in the long term, these additional stresses, which are variable, can lead to fracture by fatigue.

Figure 6:
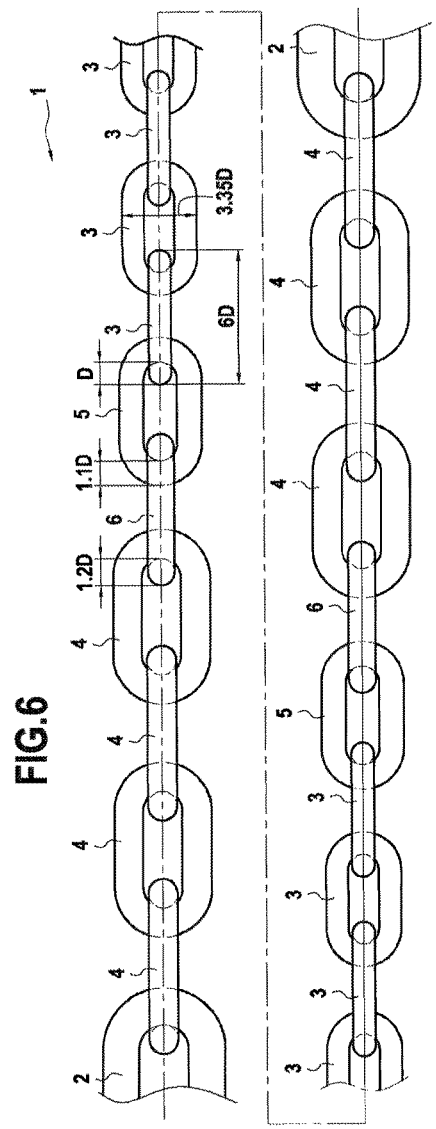
FIG. 6 shows an anchor chain segment in a first embodiment.

In order to avoid that, in a first embodiment as shown in FIG. 6, an anchor chain 1 comprises, between two ends connected to anchor shackles 2, a first plurality of successive common links 3 and a second plurality of enlarged end links 4 comprising at least three successive end links 4 at each end of the chain 1. More specifically, in the embodiment shown, this second plurality of end links 4 comprises four end links 4 at each end of the chain 1. In order to ensure a transition that is gradual between the common links 3 and the end links 4, the chain 1 also includes, at each end, a first intermediate link 5 adjacent to the common links 3, and a second intermediate link 6 adjacent to the end links 4.

In this chain 1, each of the common links 3 presents a bar diameter D, the first intermediate link 5 presents a bar diameter substantially greater than the bar diameter D of the common links 3, e.g. 1.1 times D, the second intermediate link 6 presents a bar diameter substantially greater than the bar diameter of the first intermediate link 5, e.g. 1.2 times D, and each of the end links 4 presents a bar diameter $D_{end}$ substantially greater than the bar diameter of the second intermediate link 6, e.g. 1.3 times D. In the embodiment shown, all of the links 3, 4, 5, and 6 also have the same diameter/width/length ratios of 1:3.35:6.

Also, the end links 4 present not only a bar diameter that is substantially greater than the bar diameter of the other links 3, 5, and 6, but they are made of a material that also presents an elastic limit in tension that is substantially greater than that of the common links 3, e.g. 20% greater.

Because of their larger diameter and their higher elastic limit in tension, the end links 4 are substantially less sensitive to lateral forces than are the common links 3. For a given lateral force, the bending moment $M_{extrem}$ transmitted between two such end links 4 may be defined by the following formula:

$$M_{extrem} = M_{courant} \cdot K_{mat} \cdot K_{diam} \cdot D_{extrem}/D$$

where $M_{courant}$ corresponds to the bending moment that would be transmitted between two links of dimensions and material identical to those of the common links 3 taking the place of the end links 4, $K_{mat}$ corresponds to an improvement coefficient due to the increase in the elastic limit, and $K_{diam}$ corresponds to an improvement coefficient due to the increase in the diameter of the bar. The ratio $D/D_{extrem}$ corresponds to the increase in the lever arm because of the increase in the diameter of the bar and the increase in the other dimensions of the link.

An increase of 20% in the elastic range of the material of the end links 4 relative to the test load at which the chain 1 is to be tested, which corresponds to 70% of the breaking load of the weakest links in the chain 1, i.e. the common links 3, enables the contact area affected by strength tests to be reduced, thereby resulting in a reduction in the stress concentration factor (SCF) of $SCF_{courant}=1.25$ for a link having the elastic limit of the common links 3, to $SCF_{extrem}=1.06$ for the end links 4. The coefficient $K_{mat}$ may be calculated using the following formula:

$$K_{mat} = 1 - SCF_{extrem}/SCF_{courant}$$

which, with the above mentioned values, results in $K_{mat}=0.85$.

Furthermore, the greater diameter of the end links 4 also leads to a reduction in the areas of contact between adjacent links damaged by the load test, which reduction is to be seen in the coefficient $K_{diam}$, which, in the embodiment shown, may be 0.95.

Above all, for a given bending moment being transmitted between adjacent links, the bending stress is inversely proportional to the cube of the bar diameter of the links. Consequently, if $\sigma_{xx,extrem}$ represents the stress induced by the bending moment $M_{extrem}$ in such an end link 4, and $\sigma_{xx,courant}$ represents the stress that would be induced by the bending moment $M_{courant}$ in a common link 3, then the relationship between these two stresses can be expressed by the following formula:

$$\sigma_{xx,extrem} = \sigma_{xx,courant} \cdot K_{mat} \cdot K_{diam} \cdot (D/D_{extrem})^2$$

which, with the above mentioned values, results in $$\sigma_{xx,extrem} = 0.48 \cdot \sigma_{xx,courant}.$$

With these values, the stresses induced by bending at the head end of the chain are thus reduced by more than half, which represents the lifetime of the chain 1 being multiplied by a ratio of $(1/0.48)^3 = 9.04$.

Although in this first embodiment the links 3, 4, 5, and 6 are not stud links, the same principle is equally applicable to stud links, such as the links in the chain of the second embodiment shown in FIG. 7. Apart from the transverse studs 7 in the links, all of the elements are equivalent to elements of the chain in the embodiment shown in FIG. 6, and they are thus given the same reference numbers.

Furthermore, although in both embodiments shown, the anchor chains are provided with end links and enlarged intermediate links at both ends of the chain, it is equally possible to provide them at only one end of the chain.

Because of their increased resistance to fatigue, these chains are particularly applicable to long-term anchoring of floating bodies, such as a floating platform 8 supporting a wind turbine for generating electricity, as shown in FIG. 8, or an under-sea marine turbine 9, as shown in FIG. 9.

Although the present invention is described with reference to a specific embodiment, it is clear that various modifications and changes may be made to these embodiments without going beyond the general ambit of the invention as defined by the claims. Also, individual characteristics of the various embodiments described may be combined in additional embodiments. Consequently, the description and the drawings should be considered in a sense that is illustrative rather than restrictive.

The invention claimed is:

1. An anchor chain comprising a first plurality of links and, a second plurality of links comprising at least three successive links at a first end of the anchor chain and at least three other successive links at a second end of the anchor chain, opposite from said first end, wherein in each link of the second plurality of links at least one property selected from a bar diameter and an elastic limit of its material is substantially greater than in each of the links of the first plurality of links.

2. The anchor chain according to claim 1, wherein the bar diameter of each of the links of the second plurality of links is substantially greater than the bar diameter of each of the links of the first plurality of links.

3. The anchor chain according to claim 2, wherein the bar diameter of each of the links of the second plurality of links is at least 1.2 times the bar diameter of each of the links of the first plurality of links.

4. The anchor chain according to claim 1, wherein the elastic limit of the material of each of the links of the second plurality of links is substantially greater than the elastic limit of the material of each of the links of the first plurality of links.

5. The anchor chain according to claim 4, wherein the elastic limit of the material of each of the links of the second plurality of links is at least 1.2 times the elastic limit of the material of each of the links of the first plurality of links.

6. The anchor chain according to claim 1, further including at least one intermediate link between said first plurality of links and said at least three successive links of the second plurality of links at the first end, said at least one intermediate link differing from each of the links of the first plurality of links and of the second plurality of links.

7. The anchor chain according to claim 6, wherein said at least one intermediate link presents a bar diameter substantially greater than the bar diameter of each of said first plurality of links, but less than the bar diameter of each of the links of the second plurality of links.

8. The anchor chain according to claim 7, wherein the at least one intermediate link includes at least one first intermediate link adjacent to said first plurality of links, and at least one second intermediate link adjacent to said at least three successive links of the second plurality of links at the first end, the at least one second intermediate link presenting a bar diameter that is substantially greater than the bar diameter of the at least one first intermediate link.

9. A floating body having at least one anchor chain comprising a first plurality of links and, a second plurality of links comprising at least three successive links at a first end of the anchor chain and at least three other successive links at a second end of the anchor chain, opposite from said first end, wherein in each link of the second plurality of links at least one property selected from a bar diameter and an elastic limit of its material is substantially greater than in each of the links of the first plurality of links.

10. The floating body according to claim 9, in the form of a floating platform.

11. The floating body according to claim 9, supporting at least one device for generating electricity.

12. The floating body according to claim 11, wherein said device for generating electricity is a wind turbine.

* * * * *